United States Patent [19]

Bernhardt et al.

[11] Patent Number: 4,861,116
[45] Date of Patent: Aug. 29, 1989

[54] ANTI-SKID AND DRIVE SLIP CONTROL SYSTEM

[75] Inventors: Wolfgang Bernhardt, Korntal; Gerhard Wetzel, Stuttgart, both of Fed. Rep. of Germany

[73] Assignee: Robert Bosch GmbH, Stuttgart, Fed. Rep. of Germany

[21] Appl. No.: 246,705

[22] Filed: Sep. 20, 1988

[30] Foreign Application Priority Data

Dec. 5, 1987 [DE] Fed. Rep. of Germany ....... 3741310

[51] Int. Cl.⁴ .............................................. B60T 8/64
[52] U.S. Cl. .................................... 303/100; 180/197; 303/116; 303/110
[58] Field of Search ................ 180/197; 303/100, 103, 303/110, 111, 114, 116, 119

[56] References Cited

U.S. PATENT DOCUMENTS 4,702,531 10/1987 Kircher et al. ..................... 303/114
4,755,008 7/1988 Imoto et al. ..................... 303/116 X Primary Examiner—Duane A. Reger
Attorney, Agent, or Firm—Edwin E. Greigg

[57] ABSTRACT

An inexpensive drive slip control system, combined with a brake control and anti-skid control system, which includes a pump element and a first valve assembly upstream of a wheel brake cylinder, a second valve assembly in the brake circuit, which can be bypassed by a fluid line, which communicates with a multi-circuit master cylinder and leads to the wheel brake cylinder of the undriven wheel and communicates via a third valve assembly with the inlet side of the pump element, the outlet side of which is connected to the brake line of the driven wheel.

20 Claims, 3 Drawing Sheets

ANTI-SKID AND DRIVE SLIP CONTROL SYSTEM

BACKGROUND OF THE INVENTION

The invention is based on an anti-skid and drive slip control system as set forth herein. An anti-skid and drive slip control system of this type is known (German Offenlegungsschrift No. 32 15 739).

In this known anti-skid and drive slip control system, the brake line between a multi-circuit master cylinder and at least one wheel brake cylinder is opened by means of a branch to the inlet side of a selfaspirating pump until such time as a switchover valve, placed in the branch and functioning via a pressure control means, interrupts the communication with the pump inlet side.

It can be assumed that a great number of brake actuations are executed within the pressure range in which the switchover valve, controlled by brake pressure, has not yet effected a separation between the pump inlet and the brake circuit; a certain amount of a pressure fluid is introduced into the inlet line of the pump element and into the pumping element itself, which is disadvantageous both in terms of the volume of pressure fluid allocated to a multi-circuit master brake cylinder and to the structural size of the master cylinder.

OBJECT AND SUMMARY OF THE INVENTION

The anti-skid and drive slip control system according to the invention, as defined by the body of claim 1, has the advantage over the prior art of being simply embodied and having fewer individual assemblies, so that they do not further increase the volume in the connection between a multi-circuit master cylinder and at least one wheel brake cylinder. A further advantage is that there is no additional switchover valve, with a predetermined closing and opening function, connected to the brake line between the multi-circuit master brake cylinder and the wheel brake cylinders.

Advantageous further features and improvements in the anti-skid and drive slip control system is defined therein.

It is particularly advantageous to use 2/2-way valves, which are economical to produce and can be used simultaneously for both anti-skid control and drive slip control.

Features set forth herein allow particularly simple control in the drive slip situation, to which end a 2/2-way valve can be triggered in clocked fashion during a pressure holding and pressure reduction phase.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
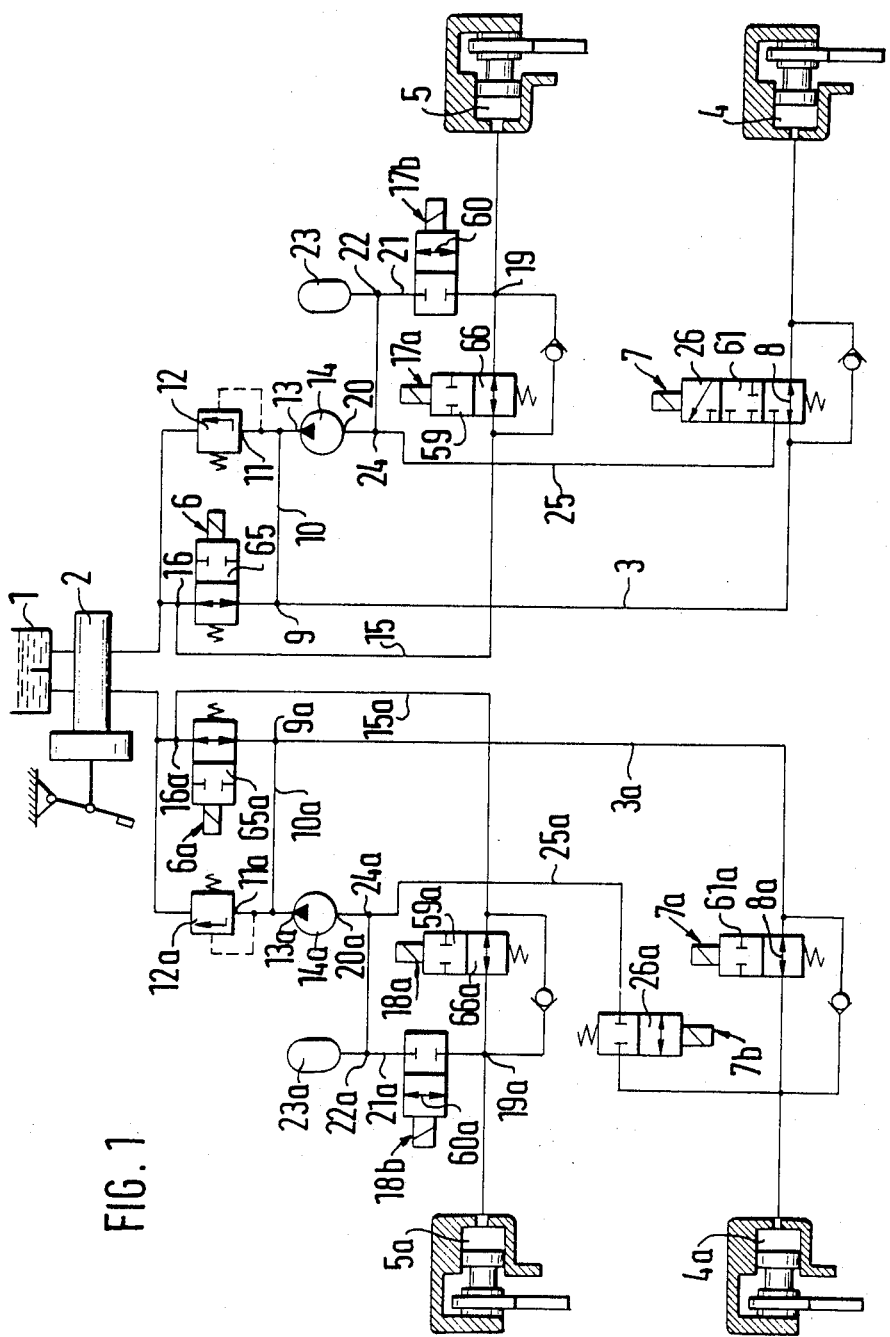
FIG. 1 shows a first exemplary embodiment of an anti-skid and drive slip control system according to the invention.

A vehicle anti-skid and drive slip control system shown in FIG. 1 has a refill container 1 for brake fluid and a multi-circuit master cylinder 2 of known construction. Brake lines 3; 3a, each for a separate brake circuit, originate in this master cylinder 2, each in a separate brake circuit pressure chamber, and each brake line leads to one drive-slip-controlled wheel brake cylinder 4; 4a and one wheel brake cylinder 5; 5a of which the drive slip is not controlled.

From the multi-circuit master cylinder 2, each of the brake lines 3; 3a leads to a respective electromagnetically actuable second valve assembly 6; 6a and from there to a respective electromagnetically actuatable first valve assembly 7; 7a, 7b, which in respective open positions 8; 8a furnishes a connection for one wheel each with a respective wheel brake cylinder 4; 4a each associated with one drive shaft. The first valve assembly may be embodied by one 3/3-way valve or two 2/2-way valves 7a, 7b.

Between the second valve assembly 6; 6a and the first valve assembly 7; 7a, 7b, a feed point 9; 9a is provided on each brake line 3; 3a, with which feed point, via a line segment 10; 10a, a connection exists with the inlet side 11; 11a of an overpressure valve 12; 12a and with the outlet or pressure side 13; 13a of a pump element 14; 14a.

A line 15; 15a each bypassing the second valve assembly 6; 6a respectively branches off from each brake line 3; 3a between the multi-circuit master cylinder 2 and each second valve assembly 6; 6a, each at a respective line connection 16; 16a and via a respective valve 17a; 18a of an electromagnetically actuatable third valve assembly 17a, 17b; 18a, 18b estblishes a connection with a respective wheel brake cylinder 5; 5a of a respective undriven wheel.

The valve 17b; 18b of each third valve assembly is disposed in a line 21; 21a branching off from a line connection 19; 19a at the line 15; 15a between the valve 17a; 18a and the wheel brake cylinder 5; 5a and leading to the inlet side 20, 20a of the pump element 14; 14a. Provided in this line 21; 21a are a respective line connection 22; 22a, each to one pressure fluid reservoir 23; 23a and a further respective line connection 24; 24a, which is connected to a line segment 25; 25a, which leads from each first valve assembly 7; 7a, 7b to the inlet side 20; 20a of each pump element 14; 14a and into which the first valve opening 7; 7a, 7b opens during the pressure reduction at a wheel brake cylinder 4; 4a of a driven wheel in a valve position 26; 26a.

Figure 2:
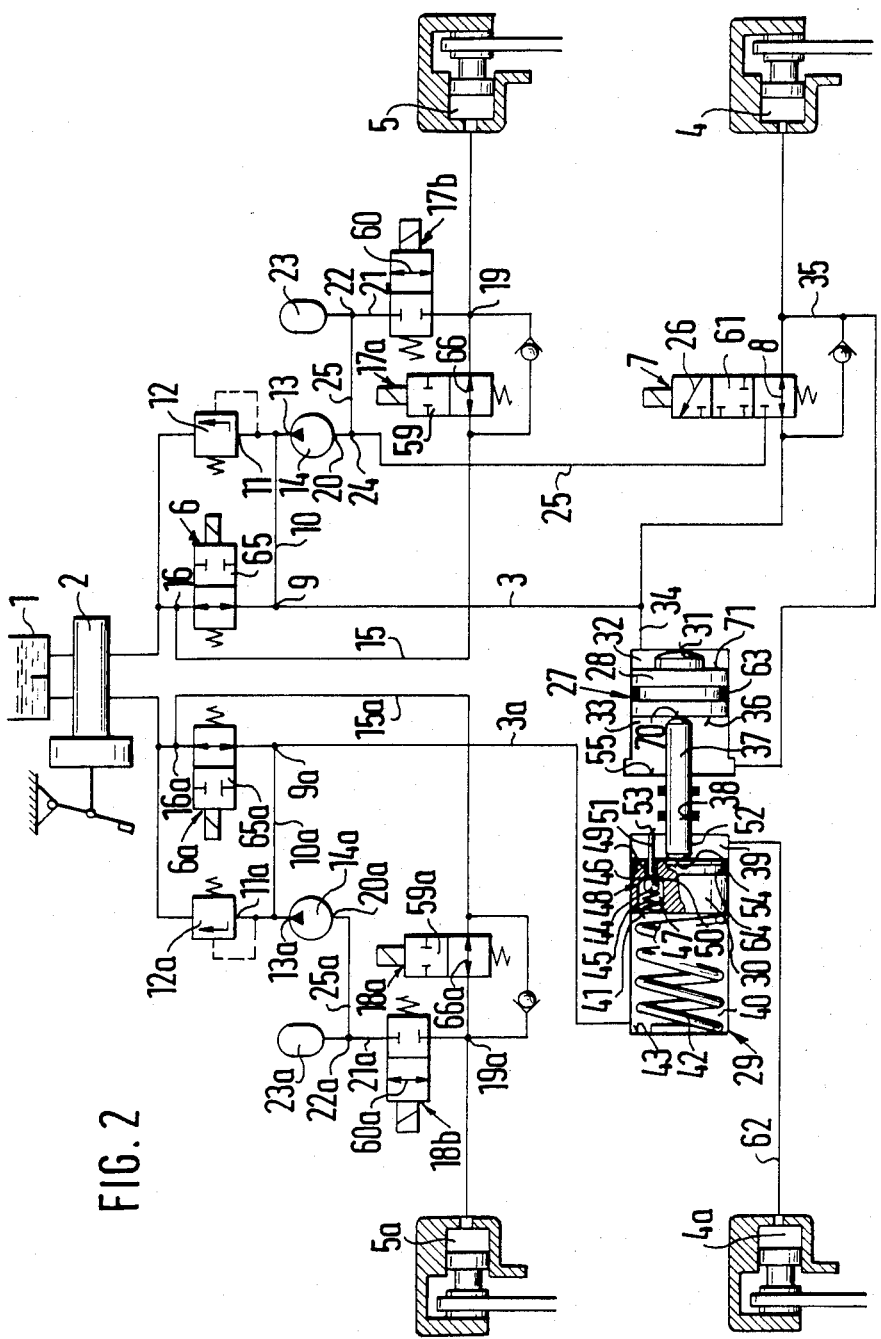
FIG. 2 shows a second exemplary embodiment of an anti-skid and drive slip control system according to the invention.

In the exemplary embodiment of FIG. 2, the same reference numerals as in FIG. 1 are used for components that have the same structure and function.

In FIG. 2, the first valve assembly, associated with the wheel brake cylinder 4a of a driven wheel, of one brake circuit is embodied by a cylinder assembly comprising both a first cylinder 27 and a first piston 28 and a second cylinder 29 and a second piston 30. The first cylinder 27 is divided by the first piston 28, which may rest on a stop 31, into a first cylinder chamber 32 and a second cylinder chamber 33. The first cylinder chamber 32 communicates with the brake line 3 of the other brake circuit via a branch 34 between the first valve assembly 7 of the driven wheel and the second valve assembly 6. The second cylinder chamber 33 likewise communicates with the brake line 3 of the other brake circuit via a branch 35 between the wheel brake cylinder 4, associated with one driven wheel, and the first valve assembly 7. The side 36 of the piston 28 oriented toward the second cylinder chamber 33 is engaged by a pin 37, which via a guide 38 disposed in a housing protrudes into a first cylinder chamber 39 of the second cylinder and touches the second piston 30, which divides the second cylinder 29 into the first cylinder chamber 39 and a second cylinder chamber 40. The second cylinder chamber 40 commuincates with the brake line 3a of the brake circuit and receives a compression spring 42, which urges the second piston 30, on a spring support face 41, in the direction toward the pin 37 and is supported at the other end of the face end 43 of this cylinder chamber 40. A push-open valve 44, 45, 46 effects communication between the second cylinder chamber 40 and the first cylinder chamber 39, from which a brake line segment 62 leads to the wheel brake cylinder 41. This push-open valve 44, 45, 46 can be disposed in the second piston 30 in a cylinder bore 47 with an ensuing conical bore 48, serving as a valve seat, and a guide bore 49; in the closing situation, a valve closing element 44 embodied as a ball element is moved by a compression spring 45 supported in the cylinder bore 47 against the valve seat 46 located in the conical bore 48. Via a predetermined closing distance (stroke) 50 and the guide bore 49, a tappet 51 joined to the valve closing element 44 in the direction of the first cylinder chamber 39 is moved into the first cylinder chamber 39. The length by which the tappet 51 protrudes into this first cylinder chamber 39 depends on the distance 52, generated by the pin 37, between the face end 53 of the first cylinder chamber 39 and a face end 54, oriented toward it, of the second piston 30. The tappet 51 may be supported at its other end on the face end 53 end 53 of the cylinder chamber 39. The push-open valve 44, 45, 46 may also be disposed in a line outside the second piston 30, an alternative not shown in the drawing. The length of the second cylinder chamber 40 between the spring support face 41 on the second piston 30 and the cylinder chamber face end 43 is predetermined as a function of the following factors: a predetermined partial volume of pressure fluid to be accommodated in the first cylinder chamber 39; a characteristic, dependent on the control operation, of the compression spring 42; and the travel of the first piston 28 in the direction toward the second cylinder 29, which is limited by the face end 55 of the cylinder chamber 33.

In the drive slip control situation, the second valve assemblies 6; 6a of each brake circuit are triggerable in clocked fashion, so that the pistons 28, 30 substantially maintain their position they have just assumed.

In the exemplary embodiment of FIG. 3, in which again the same reference numerals are used for components functioning the same as in the previous embodiments of FIGS. 1 and 2, the third valve assembly 56 associated with an undriven wheel is embodied as a 3/3-way valve, in contrast to the previous embodiments. In a "pressure buildup" position, the third valve assembly 56 connects the line 15 with the wheel brake cylinder 5; in a "pressure holding" position 58, the connection with the wheel brake cylinder 5 is interrupted and a connection of the line 15 with the inlet side 20 of the pump element 14 is opened; and in a further "pressure reduction" valve position, a connection from the wheel brake cylinder 5 to the inlet side 20 of the pump element 14 is opened.

During braking, the mode of operation of the conventional brake system remains unaffected either by a particular valve assembly or by the disposition of a pump element in the overall system. If one or more of the wheels is tending to skid, then in a known manner, sensors disposed on the wheels emit signals to an electronic control unit, by means of which the corresponding valve assemblies 7; 7a, 7b; 17a, 17b; 18a, 18b; 56 are triggered electromagnetically and switched into a second, "pressure holding" position or into a third, "pressure reduction" position, producing a predetermined pressure modulation in the wheel cylinder 4, 4a; 5, 5a. Upon excitation of the valve, the pump element 14, 14a is switched on as well, to enable relieving the wheel brake cylinders of the excess pressure fluid. In the case of the wheel brake cylinder 5, one valve 17a, during the "pressure holding" phase, switches into a closing position 59 and the other valve 17b remains in its closing position. The pumping element 14 can draw a predetermined volume of pressure fluid from the pressure fluid reservoir 23 and can pump it via the pump outlet side 13 into the line segment 10.

If the pressure in the wheel brake cylinder 5 must subsequently be reduced, then the other valve 17b is switched into an open position 60, and the pump element 14 can draw the volume of pressure fluid that has now become excessive for the wheel brake cylinder 5 from the line 21.

Figure 3:
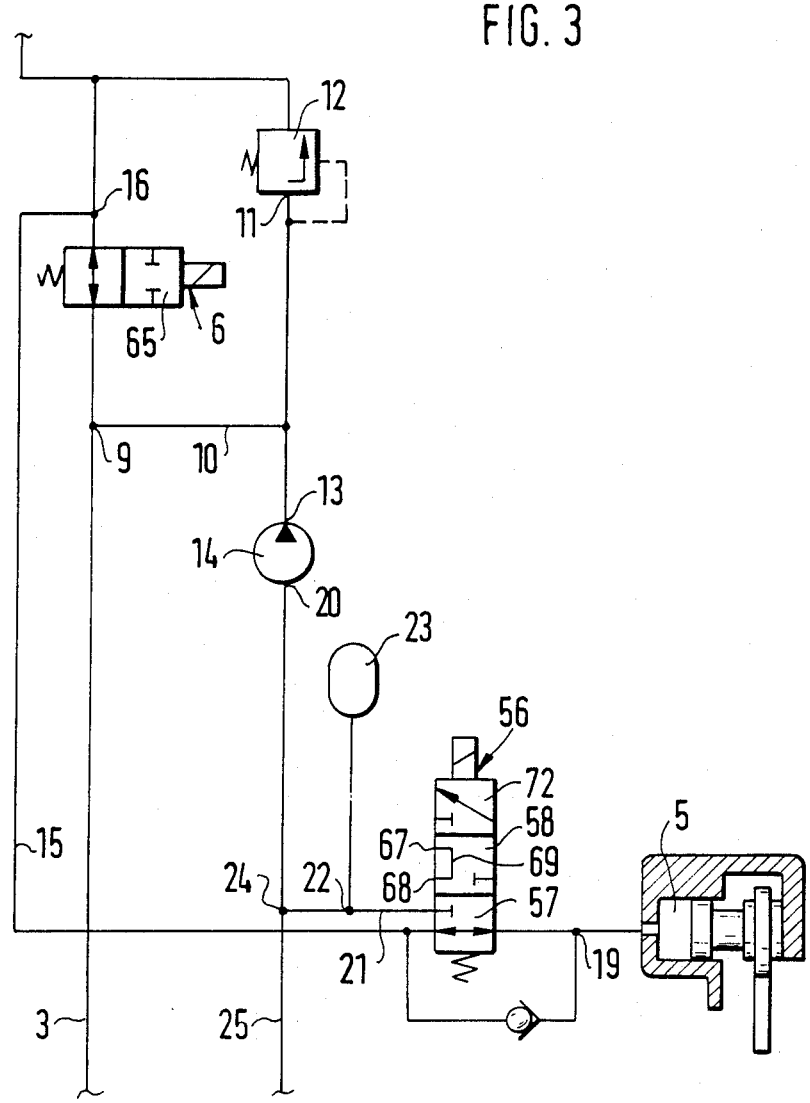
FIG. 3 is a fragmentary view of a third exemplary embodiment of an anti-skid and drive slip control system according to the invention.

If the use of the third valve assembly 56 of FIG. 3 is indicated, then it is switched into the position 58 during the "pressure holding" phase. The pump element 14, with the second valve assembly being clocked, can then pump the pressure fluid into all the lines 10, 3, 15, 21, while the influence of the brake pressure in the multicircuit master cylinder 2 remains slight. The pressure reduction in the wheel brake cylinder 5 is attained with the "pressure reduction" valve position 72 of the third valve assembly 56.

In FIG. 2, an arrangement is shown which requires one fewer of the electromagnetic valve assemblies at one wheel brake cylinder of the driven wheels.

Here, if control of the wheel brake cylinder 4a in one brake circuit becomes necessary, the valve assembly 7 of the other brake circuit can be moved into the "pressure holding" position 61 of the valve. The pressure generated in the multi-circuit master cylinder 2 is now operative in the first cylinder chamber 32 of the first cylinder 27, while no further brake pressure can be built up in the second cylinder chamber 33 through the connection with the wheel brake cylinder 4. This gives the first piston 28 an outweighing force in the direction of the second piston 30, and the two pistons are set into motion along with the pin 37; the tappet 51, along with the valve closing element 44, initially remains in its position on the face end 53 of the cylinder. In the two cylinder chambers 39, 40 of the second cylinder 29, if one driven wheel is braked via the associated wheel brake cylinder 41, the same brake prssure is present, except for slight losses, until the closing point of the push-open valve 44, 45, 46. The closing point is predetermined in accordance with a fixed closing travel (stroke) 50 to be executed. After that, the two pistons 28, 30 are in a state of force equilibrium, because there is one equal pressure in the first cylinder chamber 32 and the second cylinder chamber 40, and a different equal pressure in the second cylinder chamber 33 and the first cylinder chamber 39, and they allow further motion in the direction of the end face 43 of the second cylinder 29 only via the switchover of the first valve assembly 7; in this process, pressure fluid is drawn from the wheel brake cylinder 4, and pressure can be reduced in the wheel brake cylinder 41 by means of an increase in volume of the first cylinder chamber 39, which extends via the brake line segment 62 as far as the wheel brake cylinder 41. To attain good separation of the first cylinder chambers 32, 39 from the second cylinder chambers 33, 40 with the different pressures to be established in them, sealing elements 63, 64 can be provided in a particular disposition, preferably on the pistons. The selection of the spring force characteristic of the compression spring 42 is determined not insubstantially by the fact that in a certain control situation, re-braking at the wheel brake cylinders 4; 4a associated with the two driven wheels is avoided.

The compression spring 45 in the push-open valve provides for a predetermined closing and sealing function of the valve elements 44, 45, 46, in order to separate the first cylinder chamber 39 from the second cylinder chamber 40 during an anti-skid control situation. Between the first cylinder chamber 39 of the second cylinder 29 and the second cylinder chamber 33 of the first cylinder 27, a predetermined guide zone 38 of the pin 37 in a housing is provided.

If during startup, one of the wheels is tending to leave its state serving to drive the vehicle forward, this is detected by a sensor in a known manner and passed on, by means of a signal of the electronic control unit, to at least one valve assembly associated with a driven wheel. The wheel brake cylinders 4; 4a are associated with the drive wheels and can be controlled both individually and together.

The mode of operation in the drive slip control situation will now be described for the wheel brake cylinder 4, referring to FIG. 1. By means of a controlled switchover, the second valve assembly 6 is moved into the closing position 65 and the two valves 17a, 17b of the third valve assembly 17a, 17b are moved into the open positions 60, 66. In this process, for the switched-on pump element 14, a suction line is connected from the multi-circuit master cylinder 2 as far as the pump element inlet 20 and a pressure line is connected from the pump element outlet 13 via the opened first valve assembly 7 as far as the wheel brake cylinder 4. If a predetermined pressure modulation becomes necessary in the wheel brake cylinder 4, the first valve assembly 7 can be switched into either the pressure holding position 61 or the pressure reduction position 26. To prevent the brake pressure, which may be further produced in the pressure modulation process, in the lines 10, 3 from increasing excessively, the attainable pressure level may be limited by means of a predetermined clocked triggering of the second valve assembly 6.

If the first valve assembly is embodied by two 2/2-way valves 7a, 7b, as shown for the brake circuit on the left in FIG. 1, the two valves 7a, 7b are in the closing position if the pressure holding phase becomes necessary. If a pressure reduction in the wheel brake cylinder 4a then becomes necessary, the electronic control unit switches the second valve 7b into the opening position 26a.

If the third valve assembly 56 is used, then for a drive slip control process, the valve is switched into the valve position 58, in which it communicates via its first connection 67 with the pump element inlet side 20 and via its second connection 68 with the line 15 leading to the multi-circuit master cylinder.

The two connections 67, 68 have a line bridge 69 located within the valve position 58. This makes it possible for pressure fluid to be drawn out of the multi-circuit master cylinder 2 by the pump element 14.

If a predetermined first valve assembly is to be replaced at one wheel brake cylinder, then as FIG. 2 shows, one driven wheel is preceded by a cylinder assembly comprising two cylinders 27, 29. In the drive slip control situation for the driven wheel associated with the wheel brake cylinder 4a, the second valve assembly 6a is moved into the closing position 65a, and the valves of the third valve assembly 18a, 18b are switched into the open position. The pump element 14a which is switched on at the same time pumps pressure fluid out of the multi-circuit master cylinder 2 into the second cylinder chamber 40 of the second cylinder 29 and, by means of the push-open valve 44, 45, 46, which is in the open position, into the first cylinder chamber 39, and from there to the wheel brake cylinder 4a. If a predetermined pressure level must be maintained or reduced in the wheel brake cylinder, then the second valve assembly 6a is to be triggered in clocked fashion for the particular situation required.

During drive slip control of the driven wheel associated with the wheel brake cylinder 4 and drive slip control of both driven wheels, pressure fluid is moved during the pressure buildup phase into the wheel brake cylinder 4, and the required pressure becomes operative in the first cylinder chamber 32 via the branch 34 of the brake line 3 and in the second cylinder chamber 33 of the first cylinder 27 via the branch 35. This pressure also acts upon the face 70 of the pin 37 urged in the direction of the second piston 30; this face 70 may be dimensioned such that in this case the pin 37 is not moved toward the second piston 30.

If a predetermined pressure modulation inside the wheel brake cylinder 4 is required, then the first valve assembly 7; 7a, 7b can be switched during the pressure holding phase into the valve position 61; 61a and in the pressure reduction phase into the valve position 26; 26a.

To prevent the pressure in the line system connected to the pump outlet side 13 and thus in the first cylinder chamber 32 of the first cylinder 27 as well from rising excessively, the second valve assembly 6; 6a is triggered in clocked fashion for the "pressure holding" and "pressure reduction" phases. The prevailing and controlled pressure in the wheel cylinder 4 and via the branch 35 in the second cylinder chamber 33 remains insignificantly higher than or lower than the pressure prevailing in the first cylinder chamber 32. A substantial motion of the first piston 28 due to a predetermined pressure difference, resulting from the imposition of a high pressure on the piston face 71 and of a low pressure on the piston face 36, is avoided.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An anti-skid and drive slip control system for vehicles, with driven wheels having associated therewith a respective wheel brake cylinder, a multicircuit master cylinder communicating via a brake line with each said wheel brake cylinder, at least one first valve assembly connected with one of the driven wheels and located in a brake circuit and switchable in anti-skid and drive slip control situations by assuming switching positions for pressure buildup, pressure holding and pressure reduction at a wheel brake, at least one second valve assembly connected with one of the brake circuits and between the multi-circuit master cylinder and the first valve assembly, said second valve assembly connected between the multi-circuit master cylinder and the first valve assembly in one of the brake circuits is controllable only in a drive slip control situation, at least one pump element by which pressure fluid can be pumped into the brake line between the first and second valve assemblies, a third valve assembly in a pressure line connected with each undriven wheel in a brake circuit, said third valve assembly comprises first and second valves (17a, 17b; 18a, 18b), of which said first valve (17a; 18a) establishes or interrupts a connection with the wheel brake cylinder (5; 5a) of the undriven wheel and bypasses said second valve assembly (6; 6a), and said second valve (17b; 18b) is located in a connection branching off from the brake line between the wheel brake cylinder (5; 5a) and said first valve (17a; 18a) and leads to an inlet side (20; 29a) of said pump element (14; 14a), and in the drive slip control situation, said first and second valves (17a, 17b; 18a, 18b) are open.

2. An anti-skid and drive slip control system as defined by claim 1, in which an outlet side (13; 13a) of the pump element (14; 14a) is connectable to the multicircuit master cylinder (2) via an overpressure valve (12; 12a).

3. An anti-skid and drive slip control system as defined by claim 1, in which said second valve assembly (6; 6a) and said third valve assembly (17a, 17b; 18a, 18b) of one brake circuit comprises 2/2-way valves, and in the anti-skid control situation, during pressure holding in a wheel brake cylinder (4, 4a; 5, 5a), said first valve assembly (7; 7a, 7b) and said third valve assembly (17a, 17b; 18a, 18b) are in a closing position, and during a pressure reduction in the wheel brake cylinders (4, 4a; 5, 5a), said first valve assembly (7; 7a, 7b) and said second valve (17b; 18b) of said third valve assembly (17a, 17b; 18a, 18b) are held in the open position toward said inlet side (20; 20a) of said pump element (14; 14a) and said first valve (17a; 18a) of said third valve assembly is held in the closed position, and during the drive slip control situation said third valve assembly (17a, 17b; 18a, 18b) is opened, and said first valve assembly (7; 7a, 7b) in a pressure holding phase is closed and in a pressure reduction phase said first valve assembly is switched into a position that opens the wheel brake cylinders (4, 4a; 5, 5a) toward said inlet side (20; 20a) of said pump element (14; 14a).

4. An anti-skid and drive slip control system as defined by claim 1, in which the first valve assembly (7) comprises a 3/3-way valve.

5. An anti-skid and drive slip control system as defined by claim 2, in which the first valve assembly (7) comprises a 3/3-way valve.

6. An anti-skid and drive slip control system as defined by claim 3, in which the first valve assembly (7) comprises a 3/3-way valve.

7. An anti-skid and drive slip control system as defined by claim 1, in which said first valve assembly comprises first and second 2/2-way valves (7a, 7b), which in an antiskid control situation is closed during pressure holding in the wheel brake cylinder, and of which said first 2/2-way valve (7a) remains closed during a pressure reduction and said second 2/2-way valve (7b) opens, and in the drive slip control situation, said first and second 2/2-way valves are closed in a pressure holding phase, and only said second 2/2-way valve (7b) opens, during the pressure reduction of the wheel brake cylinder (4a), toward said inlet side (20a) of said pump element (14a).

8. An anti-skid and drive slip control system as defined by claim 2, in which said first valve assembly comprises first and second 2/2-way valves (7a, 7b), which in an antiskid control situation is closed during pressure holding in the wheel brake cylinder, and of which said first 2/2-way valve (7a) remains closed during a pressure reduction and said second 2/2-way valve (7b) opens, and in the drive slip control situation, said first and second 2/2-way valves are closed in a pressure holding phase, and only said second 2/2-way valve (7b) opens, during the pressure reduction of the wheel brake cylinder (4a), toward said inlet side (20a) of said pump element (14a).

9. An anti-skid and drive slip control system as defined by claim 3, in which said first assembly comprises first and second 2/2-way valves (7a, 7b), which in an anti-skid control situation is closed during pressure holding in the wheel brake cylinder, and of which said first 2/2-way valve (7a) remains closed during a pressure reduction and said second 2/2-way valve (7b) opens, and in the drive slip control situation, said first and second 2/2-way valves are closed in a pressure holding phase, and only said second 2/2-way valve (7b) opens, during the pressure reduction of the wheel brake cylinder (4a), toward said inlet side (20a) of said pump element (14a).

10. An anti-skid and drive slip control system as defined by claim 1, in which said second valve assembly (6; 6a) is triggerable in clocked fashion in the drive slip control situation.

11. An anti-skid and drive slip control system as defined by claim 4, in which said second valve assembly (6; 6a) is triggerable in clocked fashion in the drive slip control situation.

12. An anti-skid and drive slip control system as defined by claim 7, in which said second valve assembly (6; 6a) is triggerable in clocked fashion in the drive slip control situation.

13. An anti-skid and drive slip control system as defined by claim 1, in which said first valve assembly, associated with a driven wheel, of one brake circuit is embodied by a cylinder assembly having a first cylinder (27), a first piston (28) in said first cylinder, a second cylinder (29), a second piston (30), in said second cylinder, said first piston (28) in the first cylinder (27) divides a first cylinder chamber (32) from a second cylinder chamber (33) and rests on a stop (31), said first cylinder chamber (32) communicates with the brake line (3), a brake circuit via a branch (34) between said first valve assembly (7; 7a, 7b) of the driven wheel and the wheel brake cylinder (4), said first piston (28) is engaged remote from the stop (31) by a pin (37), which protrudes into the second cylder (29) and contacts said second piston (30), which divides the second cylinder (29) into a first cylinder chamber (39) and a second cylinder chamber (40), said second cylinder chamber (40) communicates with the brake line (3a) of the second brake circuit, a spring (42) urges the second piston (30) toward the pin (37), and is connectable via a push-open valve (44, 45, 46) with the first cylinder chamber (39), from which a brake line segment (62) leads to the wheel brake cylinder (4a), wherein the second valve assemblies (6; 6a) of each brake circuit are triggerable in clocked fashion in the drive slip control situation in such a manner that the first and second pistons (28, 30) substantially maintain their position.

14. An anti-skid and drive slip control system as defined by claim 2, in which said first valve assembly, associated with a driven wheel, of one brake circuit is embodied by a cylinder assembly having a first cylinder (27), a first piston (28) in said first cylinder, a second cylinder (29), a second piston (30), in said second cylinder, said first piston (28) in the first cylinder (27) divides a first cylinder chamber (32) from a second cylinder chamber (33) and rests on a stop (31), said first cylinder chamber (32) communicates with the brake line (3) a brake circuit via a branch (34) between said first valve assembly (7; 7a, 7b) of the driven wheel and the wheel brake cylinder (4), said first piston (28) is engaged remote from the stop (31) by a pin (37), which protrudes into the second cylinder (29) and contacts said second piston (30), which divides the second cylinder (29) into a first cylinder chamber (39) and a second cylinder chamber (40), said second cylinder chamber (40) communicates with the brake line (3a) of the second brake circuit, a spring (42) urges the second piston (30) toward the pin (37), and is connectable via a push-open valve (44, 45, 46) with the first cylinder chamber (39), from which a brake line segment (62) leads to the wheel brake cylinder (4a), wherein the second valve assemblies (6; 6a) of each brake circuit are triggerable in clocked fashion in the drive slip control situation in such a manner that the pistons (28, 30) substantially maintain their position.

15. An anti-skid and drive slip control system as defined by claim 4, in which said first valve assembly, associated with a driven wheel, of one brake circuit is embodied by a cylinder assembly having a first cylinder (27), a first piston (28) in said first cylinder, a second cylinder (29), a second piston (30), in said second cylinder, said first piston (28) in the first cylinder (27) divides a first cylinder chamber (32) from a second cylinder chamber (33) and rests on a stop (31), said first cylinder chamber (32) communicates with the brake line (3) a brake circuit via a branch (34) between said first valve assembly (7; 7a, 7b) of the driven wheel and the wheel brake cylinder (4), said first piston (28) is engaged remote from the stop (31) by a pin (37), which protrudes into the second cylinder (29) and contacts said second piston (30), which divides the second cylinder (29) into a first cylinder chamber (39) and a second cylinder chamber (40), said second cylinder chamber (40) communicates with the brake line (3a) of the second brake circuit, a spring (42) urges the second piston (30) toward the pin (37), and is connectable via a push-open valve (44, 45, 46) with the first cylinder chamber (39), from which a brake segment (62) leads to the wheel brake cylinder (4a), wherein the second valve assemblies (6; 6a) of each brake circuit are triggerable in clocked fashion in the drive slip control situation in such a manner that the pistons (28, 30) substantially maintain their position.

16. An anti-skid and drive slip control system as defined by claim 7, in which said first valve assembly, associated with a driven wheel, of one brake circuit is embodied by a cylinder assembly having a first cylinder (27), a first piston (28) in said first cylinder, a second cylinder (29), a second piston (30), in said second cylinder, said first piston (28) in the first cylinder (27) divides a first cylinder chamber (32) from a second cylinder chamber (33) and rests on a stop (31), said first cylinder chamber (32) communicates with the brake line (3) a brake circuit via a branch (34) between said first valve assembly (7; 7a, 7b) of the driven wheel and the wheel brake cylinder (4), said first piston (28) is engaged remote from the stop (31) by a pin (37), which protrudes into the second cylinder (29) and contacts said second piston (30), which divides the second cylinder (29) into a first cylinder chamber (39) and a second cylinder chamber (40), said second cylinder chamber (40) communicates with the brake line (3a) of the second brake circuit, a spring (42) urges the second piston (30) toward the pin (37), and is connectable via a push-open valve (44, 45, 46) with the first cylinder chamber (39), from which a brake line segment (62) leads to the wheel brake cylinder (4a), wherein the second valve assemblies (6; 6a) of each brake circuit are triggerable in clocked fashion in the drive slip control situation in such a manner that the pistons (28, 30) substantially maintain their position.

17. An anti-skid and drive slip control system as defined by claim 10, in which said first valve assembly, associated with a driven wheel, of one brake circuit is embodied by a cylinder assembly having a first cylinder (27), a first piston (28) in said first cylinder, a second cylinder (29), a second piston (30), in said second cylinder, said first piston (28) in the first cylinder (27) divides a first cylinder chamber (32) from a second cylinder chamber (33) and rests on a stop (31), said first cylinder chamber (32) communicates with the brake line (3), a brake circuit via a branch (34) between said first valve assembly (7; 7a, 7b) of the driven wheel and the wheel brake cylinder (4), said first piston (28) is engaged remote from the stop (31) by a pin (37), which protrudes into the second cylinder (29) and contacts said second piston (30), which divides the second cylinder (29) into a first cylinder chamber (39) and a second cylinder chamber (40), said second cylinder chamber (40) communicates with the brake line (3a) of the second brake circuit, a spring (42) urges the second piston (30) toward the pin (37), and is connectable via a push-open valve (44, 45, 46) with the first cylinder chamber (39), from which a brake line segment (62) leads to the wheel brake cylinder (4a), wherein the second valve assemblies (6; 6a) of each brake circuit are triggerable in clocked fashion in the drive slip control situation in such a manner that the first and second pistons (28, 30) substantially maintain their position.

18. An anti-skid and drive slip control system for vehicles, including driven wheels and non-driven wheels, each of the wheels is associated with a respective wheel brake cylinder, a multi-circuit master cylinder which communicates via a brake line with at least one first valve assembly connected with one driven wheel and located in the brake line and operable in an anti-skid and drive slip control situation to assume switching positions for pressure buildup, pressure holding and pressure reduction at a wheel brake, at least one second valve assembly connected with one of the brake circuits, between the multi-circuit master cylinder and the first valve assembly, said second valve assembly is controllable only in the drive slip control situation, at least one pump element by means of which pressure fluid can be pumped into the brake line between the first and second valve assemblies, a third valve assembly (56), associated with each undriven wheel in one of the brake circuits and embodied as a 3/3-way valve, which in the drive slip control situation is controllable into a position in which a connection to an inlet side (20; 20a)

of the pump element (14; 14a) which bypasses the second valve assembly (6; 6a) is opened.

19. An anti-skid and drive slip control system as defined by claim 8, in which said second valve assembly (6; 6a) is triggerable in clocked fashion in the drive slip control situation.

20. An anti-skid and drive slip control system as defined by claim 9, in which said first valve assembly connected with a driven wheel of one brake circuit is embodied by a cylinder assembly having a first cylinder (27) and a first piston (28), a second cylinder (29), a second piston (30) in said second cylinder, said first piston (28) divides said first cylinder (27) into a first cylinder chamber (32) and a second cylinder chamber (33) and rests on a stop (31), said first cylinder chamber (32) communicates with the brake line (3) of one brake circuit via a branch (34) between the first valve assembly (7; 7a, 7b) of the driven wheel and the wheel brake cylinder (4), and the first piston (28) is engaged remote from the stop (31) by a pin (37), said pin protrudes into the second cylinder (29) and contacts the second piston (30), which divides the second cylinder (29) into a first cylinder chamber (39) and a second cylinder chamber (40), said second cylinder chamber (40) communicates with the brake line (3a) of the second brake circuit, a spring (42) in the second cylinder chamber urges the second piston (30) toward the pin (37), and said second cylinder chamber is connectable via a one-way push-open valve (44, 45, 46) with the first cylinder chamber (39), from which a brake line segment (62) leads to the wheel brake cylinder (4a), wherein the second valve assemblies (6; 6a) of each brake circuit are triggerable in clocked fashion in the drive slip control situation in such a manner that the pistons (28, 30) substantially maintain their position.

* * * * *